Dec. 8, 1953  G. HOOKHAM  2,661,771
GOGGLE VALVE
Filed Oct. 26, 1949  2 Sheets-Sheet 1
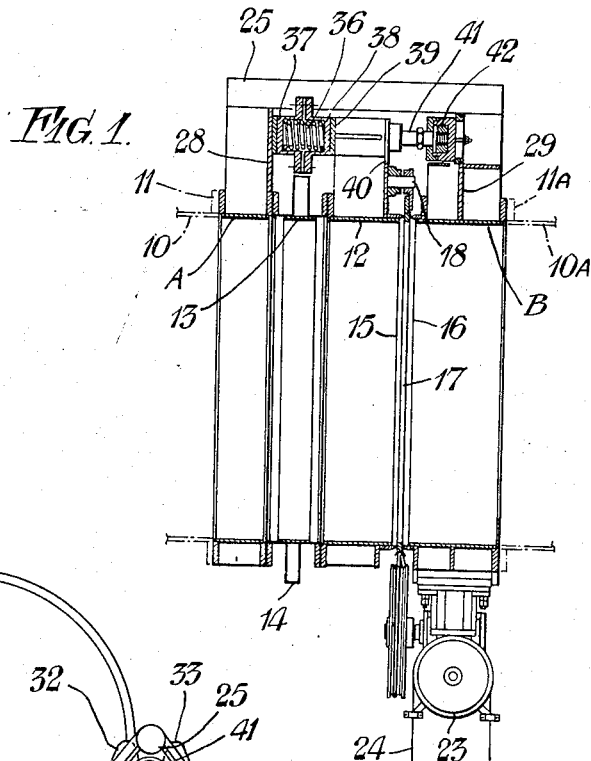
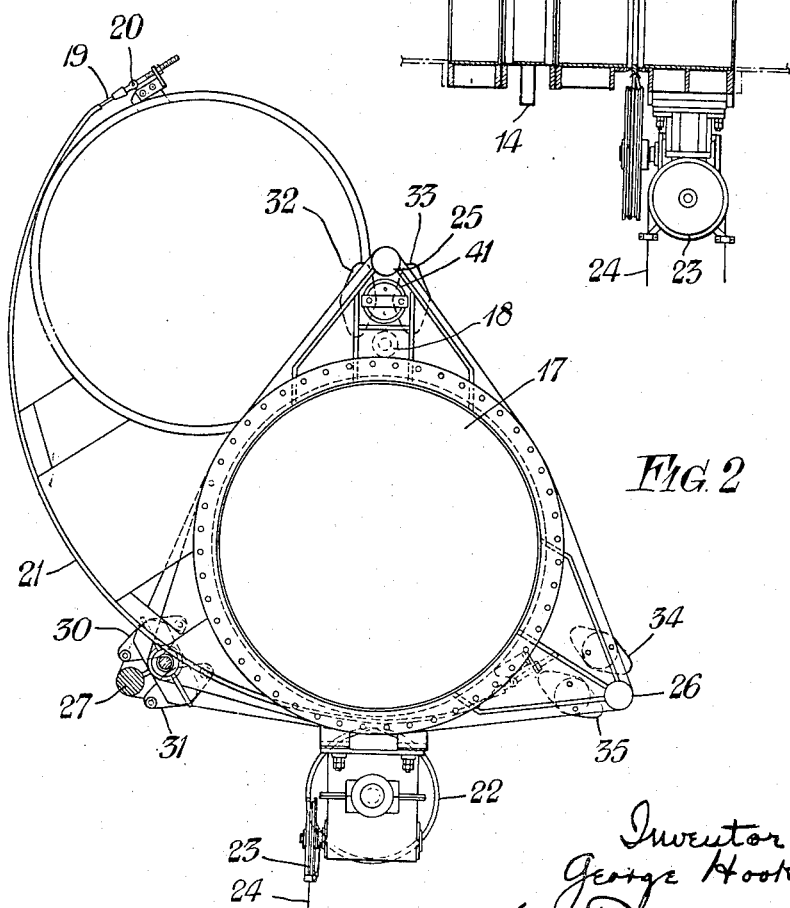
Inventor
George Hookham
by Malcolm W. Pierce
attorney Dec. 8, 1953  G. HOOKHAM  2,661,771
GOGGLE VALVE
Filed Oct. 26, 1949  2 Sheets-Sheet 2
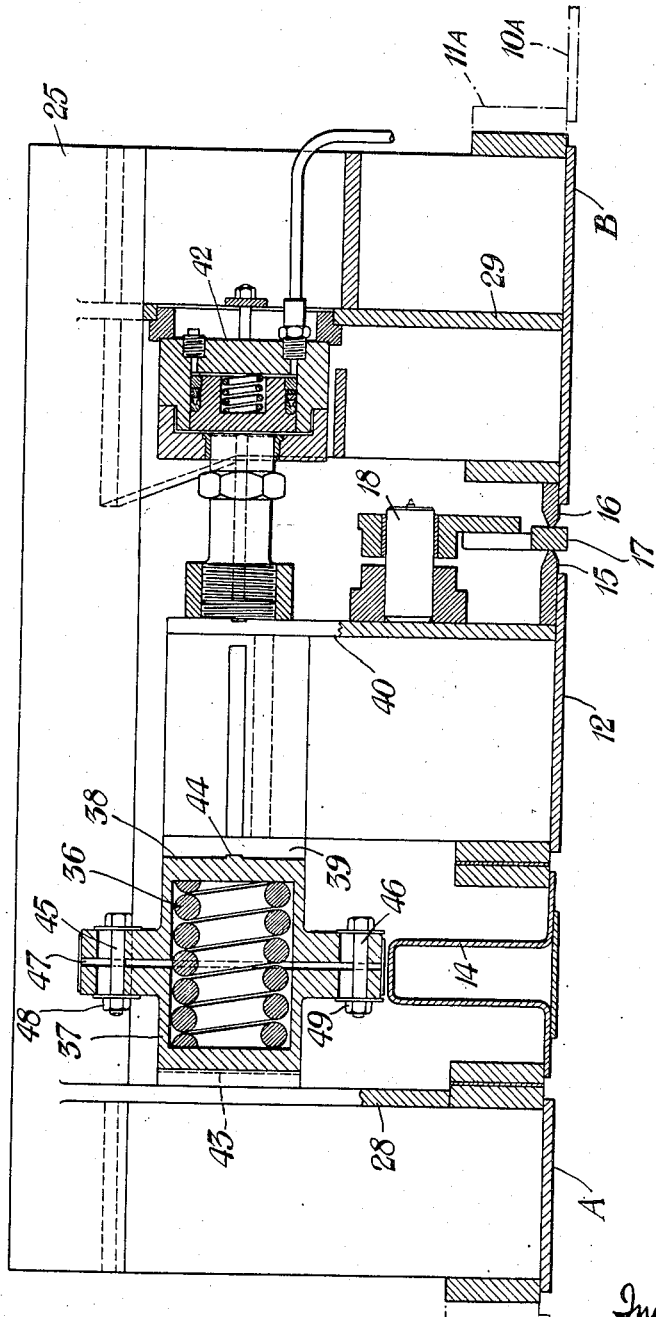
FIG. 3.
Inventor
George Hookham
by Malcolm W. Tracy
attorney Patented Dec. 8, 1953

2,661,771

UNITED STATES PATENT OFFICE 2,661,771

GOGGLE VALVE

George Hookham, London, England, assignor to John Miles & Partners (London) Limited, London, England, a British company Application October 26, 1949, Serial No. 123,622

Claims priority, application Great Britain September 7, 1949

5 Claims. (Cl. 138—94)

The present invention relates to an improved plate or goggle valve of the kind commonly used for controlling the flow of fluid through pipes of large diameter.

It is common practice at the present time, in order to control the flow of fluid through a pipe, to make a gap in the pipe and insert in the gap a valve which consists essentially of two short lengths of pipe between which is nipped a movable goggle plate.

Such an arrangement has the advantage that the valve as a whole can be assembled in the workshop and then moved transversely into position in the gap, or can be unbolted and moved transversely within the gap, for repair, and all with little disturbance.

A valve of this known kind comprises the said two short lengths of pipes, a bridging member for holding adjacent ends of the pipes at a fixed axial distance apart, a ring located between the fixed ends, an expansion joint between one end and the ring, a movable goggle plate situated between valve seats formed on the ring and the other end, a plurality of springs for nipping the plate between the seats and hydraulic rams for forcing the seats apart, against the action of the springs, so that the goggle plate can be moved transversely of the pipes.

Nevertheless, with these known arrangements, it is not possible to remove a single spring for repair independently of the other springs and independently of the rams, so that whenever one spring has to be repaired, the whole goggle valve is placed out of commission or its functioning is at least seriously impaired. The same conditions apply if a ram has to be removed for repair.

Accordingly it is an object of the present invention to provide means whereby either a single spring or a single ram can be removed for replacement or repair without placing the goggle valve out of commission or seriously impairing its function.

It is an object of the present invention to provide, in a valve of this kind, means whereby each of the springs may be removed for repair or replacement independently of the rams and of all the other springs and without rendering the valve inoperative.

Preferably three pairs of springs are spaced angularly around the pipes, each spring being housed in a contractable and expansible two-part box which is normally under compression so as to force the two parts against the ring and a pipe-end respectively, means being provided for contracting each box, against the action of the contained springs, to bring the two parts away from these members.

A preferred form of the invention will now be described with reference to the accompanying diagrammatic drawings, in which Figure 1 is a longitudinal section through a valve, Figure 2 is an end elevation of the valve, partly in section, and Figure 3 is a longitudinal section, on a more open scale, of a portion of the valve shown in the other figures.

The pipe through which the fluid to be controlled passes is shown at 10, 10A. A gap is made in it and its ends are flanged as shown at 11, 11A to receive a similarly flanged goggle valve which can be moved into the gap transversely and connected by bolts (not shown) to the flanges 11, 11A as shown in Figure 1.

The valve comprises two short lengths of pipe sections A and B between which is located a ring 12. Between the ring 12 and pipe sections A is conected by bolts (not shown) an expansion joint 13 provided with a bellows 14. The ring 12 and pipe sections B are formed with valve seats 15 and 16 respectively between which can be nipped a goggle plate 17. The goggle plate is rotatable on a pivot 18 mounted on the ring 12.

The goggle plates 17 is moved transversely with respect to the pipe sections by means of a cable 19 fixed at 20, passing around the frame 21 of the goggle plate and around a drum 22 which is controlled with the aid of a handwheel 23 and chain 24.

The pipe sections A and B are held rigidly at a fixed distance apart by means of the equiangularly spaced longitudinal rods 25, 26 and 27 and transverse plates such as those shown at 28 and 29.

The goggle plate 17 is nipped between the valve seats 15 and 16 with the aid of three pairs of springs equiangularly spaced around the pipes.

The springs are housed in three pairs of boxes 30, 31; 32, 33 and 34, 35 respectively, and one of the springs, namely that in the box 33, is shown at 36 (Figure 3).

The six springs and boxes are all identical. Each box consists of two parts 37 and 38, the former of which bears against plate 28 and the latter of which bears against a plate 39 rigid with a plate 40 fixed on the ring 12.

Between the plate 40 on the ring 12 and the plate 29 on the pipe sections B is located a hydraulic piston and cylinder 41 and 42 respectively.

When fluid is injected under pressure into the cylinder 42 the piston 41 is moved to the left with respect to Figure 1, against the action of the springs, so as to open the valve seats 15 and 16 to allow the goggle plate 17 to be angularly moved with respect to the pipe sections A and B and thus control the rate of flow of fluid through the pipe sections.

When fluid is withdrawn from the cylinder 42 the springs such as 36 again expand to force the valve seat 15 towards seat 16 and thus seal the goggle plate 17 between the seats.

The part 37 (Figure 3) of the box is formed with a spigot 43 lying in a recess formed for the purpose on the plate 28. Similarly, the part 38 of the box is formed with a spigot 44 nesting in a co-operating recess formed in the plate 39. The two spigots 43 and 44 are perpendicular.

The two halves 37 and 38 of the box are held together with the aid of bolts 45 and 46, the spring 36 normally serving to urge the parts apart so that the spigots 43 and 44 are normally seated in their respective recesses. The gap 47 between the box parts 37 and 38 is a little greater in the longitudinal direction than the depth of the spigots 43 and 44 in the same direction so that when desired nuts 48 and 49 on the bolts 45 and 46 respectively can be screwed up to close the gap 47 and thus withdraw one of the spigots 43 or 44 from its recess. When this has been done, the box, and the spring contained thereby, can be slid in the transverse direction along the other spigot and so removed from the valve for repair or replacement.

I claim:

1. A goggle valve for controlling the flow of fluid comprising two coaxially spaced pipe sections, means connected to said pipe sections for holding adjacent ends of the pipe sections at a fixed axial distance apart, an axially movable ring located between the fixed ends of the pipe sections, an expansion joint movably connecting said ring and one pipe section, a transversely movable goggle plate removably engaged between the ring and the other pipe section, a plurality of pairs of springs respectively disposed at spaced angular positions around the exteriors of the pipe sections, each of said pairs of springs being engaged between the ring and said one pipe section so as to force the ring towards the other pipe section, and rams engaged between the ring and the other pipe section to force the ring away from said other pipe section against the action of the springs so that said goggle plate may be removed from or inserted between said ring and the other pipe section, each of said springs being removable transversely of the pipes independently of the rams and all other springs.

2. A goggle valve for controlling the flow of fluid comprising two coaxially spaced pipe sections, means connected to said pipe sections for holding adjacent ends of the pipe sections at a fixed axial distance apart, an axially movable ring located between the fixed ends of the pipe sections, expansion joint movably connecting said ring and one pipe section, a transversely movable goggle plate removably engaged between the ring and the other pipe section, three pairs of spring means respectively disposed at spaced angular positions around the exteriors of the pipe sections, each of said pairs of spring means being engaged between the ring and said one pipe section so as to force the ring towards the other pipe section, and rams engaged between the ring and the other pipe section to force the ring away from said other pipe section against the action of the spring means so that said goggle plate may be moved transversely with respect to the pipe sections, each of said springs being removable transversely of the pipes independently of the rams and all other springs, each of said spring means comprising a contractable and expansible two-part box and an expansion spring engaged between the two parts of the box to urge the parts apart, said ring and said one pipe section each having a plurality of bearing parts thereon for engagement with said box parts, each of said box parts and the bearing part it engages having cooperating spigot end recess means.

3. The combination claimed in claim 2, the spigot means for each of said two-part boxes being at right angles with one another.

4. The combination claimed in claim 2, the shape and dimensions of the boxes and spigot means being such that when a box has been contracted, one of its spigot means can be withdrawn axially of the pipe sections from its cooperating recess means so that the box can then be removed transversely of the pipe in the direction of the other spigot means.

5. The combination claimed in claim 2, and means for contracting each box against the expansive action of the contained spring, whereby said box may be removed from between said bearing members.

GEORGE HOOKHAM.

References Cited in the file of this patent

UNITED STATES PATENTS

| Number | Name | Date |
| --- | --- | --- |
| 1,681,222 | Cotton | Aug. 21, 1928 |
| 1,947,453 | Bailey | Feb. 20, 1934 |
| 1,998,080 | Gerlich | Apr. 16, 1935 |
| 1,998,081 | Gerlich | Apr. 16, 1935 |

FOREIGN PATENTS

| Number | Country | Date |
| --- | --- | --- |
| 324,654 | Germany | Nov. 20, 1918 |
| 349,813 | Great Britain | June 4, 1931 |